United States Patent
Zhu et al.

(10) Patent No.: US 10,345,810 B1
(45) Date of Patent: *Jul. 9, 2019

(54) MODIFYING THE BEHAVIOR OF AN AUTONOMOUS VEHICLE USING CONTEXT BASED PARAMETER SWITCHING

(71) Applicant: WAYMO LLC, Mountain View, CA (US)

(72) Inventors: Jiajun Zhu, Sunnyvale, CA (US); Christopher Urmson, Mountain View, CA (US); David I. Ferguson, San Francisco, CA (US); Nathaniel Fairfield, Mountain View, CA (US); Dmitri A. Dolgov, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/659,071

(22) Filed: Jul. 25, 2017

Related U.S. Application Data

(63) Continuation of application No. 14/865,660, filed on Sep. 25, 2015, now Pat. No. 9,720,412, which is a (Continued)

(51) Int. Cl.
*G01C 22/00* (2006.01)
*G05D 1/00* (2006.01)
*G05D 1/02* (2006.01)

(52) U.S. Cl.
CPC .......... *G05D 1/0088* (2013.01); *G05D 1/021* (2013.01); *G05D 1/0231* (2013.01); *G05D 1/0246* (2013.01)

(58) Field of Classification Search
CPC ...... G05D 1/024; G05D 1/027; G05D 1/0274; G05D 1/0257; G05D 1/0088; G05D 1/0044; G05D 1/0248; G05D 1/0236; G05D 2201/0207; G08G 1/16; G08G 1/00; G08G 1/096716; G08G 1/096758; G08G 1/096783; G08G 1/164; G08G 1/08; G08G 1/09626; G08G 1/096725; G08G 1/096741; G08G 1/096775; G08G 1/161;
(Continued)

(56) References Cited

U.S. PATENT DOCUMENTS 5,598,164 A  1/1997  Reppas et al.
5,657,226 A  8/1997  Shin et al.
(Continued)

*Primary Examiner* — Shardul D Patel
(74) *Attorney, Agent, or Firm* — McDonnell Boehnen Hulbert & Berghoff LLP

(57) ABSTRACT

A vehicle configured to operate in an autonomous mode may operate a sensor to determine an environment of the vehicle. The sensor may be configured to obtain sensor data of a sensed portion of the environment. The sensed portion may be defined by a sensor parameter. Based on the environment of the vehicle, the vehicle may select at least one parameter value for the at least one sensor parameter such that the sensed portion of the environment corresponds to a region of interest. The vehicle may operate the sensor, using the selected at least one parameter value for the at least one sensor parameter, to obtain sensor data of the region of interest, and control the vehicle in the autonomous mode based on the sensor data of the region of interest.

20 Claims, 6 Drawing Sheets

Related U.S. Application Data continuation of application No. 13/628,546, filed on Sep. 27, 2012, now abandoned.

(58) Field of Classification Search
CPC .......... G08G 1/165; G08G 1/166; G08G 1/22; G08G 5/045; B60W 2550/402; B60W 30/12
USPC .......................................................... 701/23
See application file for complete search history.

(56) References Cited

U.S. PATENT DOCUMENTS

| | | | |
|---|---|---|---|
| 6,151,539 | A | 11/2000 | Bergholz et al. |
| 7,979,173 | B2 | 7/2011 | Breed |
| 8,260,539 | B2 | 9/2012 | Zeng |
| 2004/0239509 | A1* | 12/2004 | Kisacanin ................ A61B 5/18 340/575 |
| 2006/0009876 | A1* | 1/2006 | McNeil ................ G05D 1/0272 700/245 |
| 2008/0059015 | A1* | 3/2008 | Whittaker ............ G05D 1/0274 701/23 |
| 2008/0161987 | A1* | 7/2008 | Breed ..................... G08G 1/161 701/27 |
| 2008/0162027 | A1 | 7/2008 | Murphy et al. |
| 2009/0005980 | A1 | 1/2009 | Nakao et al. |
| 2010/0007476 | A1 | 1/2010 | Klotz et al. |
| 2010/0094520 | A1 | 4/2010 | Zagorski |
| 2010/0256836 | A1 | 10/2010 | Mudalige |
| 2010/0305858 | A1* | 12/2010 | Richardson ........ G06K 9/00785 701/301 |
| 2011/0106338 | A1 | 5/2011 | Allis et al. |
| 2011/0182475 | A1 | 7/2011 | Fairfield et al. |
| 2012/0310465 | A1 | 12/2012 | Boatright et al. |
| 2013/0060443 | A1* | 3/2013 | Shida .................. B60K 31/0008 701/96 |
| 2013/0184926 | A1* | 7/2013 | Spero ...................... B62D 1/28 701/26 |

* cited by examiner

MODIFYING THE BEHAVIOR OF AN AUTONOMOUS VEHICLE USING CONTEXT BASED PARAMETER SWITCHING

CROSS-REFERENCE TO RELATED APPLICATIONS

The present application is a continuation patent application claiming priority to U.S. application Ser. No. 13/628,546 filed Sep. 27, 2012 and U.S. application Ser. No. 14/865,660 filed Sep. 25, 2015, the contents of which are hereby incorporated by reference.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In a first aspect, a method is provided. The method includes determining, using a computer system, an environment of a vehicle. The vehicle is configured to operate in an autonomous mode and comprises a sensor configured to obtain sensor data of a sensed portion of the environment. The sensed portion is defined by at least one sensor parameter. The method also includes based on the environment of the vehicle, selecting at least one parameter value for the at least one sensor parameter such that the sensed portion of the environment corresponds to a region of interest. The method additionally includes operating the sensor, using the selected at least one parameter value for the at least one sensor parameter, to obtain sensor data of the region of interest. The method further includes controlling the vehicle in the autonomous mode based on the sensor data of the region of interest.

In a second aspect, a vehicle is provided. The vehicle includes a sensor. The sensor is configured to obtain sensor data of a sensed portion of an environment. The sensed portion is defined by at least one sensor parameter, and the vehicle is configured to operate in an autonomous mode. The vehicle also includes a computer system. The computer system is configured to determine the environment of the vehicle. The computer system is configured to, based on the environment of the vehicle, select at least one parameter value for the at least one sensor parameter such that the sensed portion of the environment corresponds to a region of interest. The computer system is also configured to operate the sensor, using the selected at least one parameter value for the at least one sensor parameter, to obtain sensor data of the region of interest. The computer system is additionally configured to control the vehicle in the autonomous mode based on the sensor data of the region of interest.

In a third aspect, a non-transitory computer readable medium having stored therein instructions executable by a computer system is provided. The functions include determining an environment of a vehicle. The vehicle is configured to operate in an autonomous mode and comprises a sensor configured to obtain sensor data of a sensed portion of the environment. The sensed portion is defined by at least one sensor parameter. The functions also include based on the environment of the vehicle, selecting at least one parameter value for the at least one sensor parameter such that the sensed portion of the environment corresponds to a region of interest. The functions additionally include operating the sensor, using the selected at least one parameter value for the at least one sensor parameter, to obtain sensor data of the region of interest. The functions further include controlling the vehicle in the autonomous mode based on the sensor data of the region of interest.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
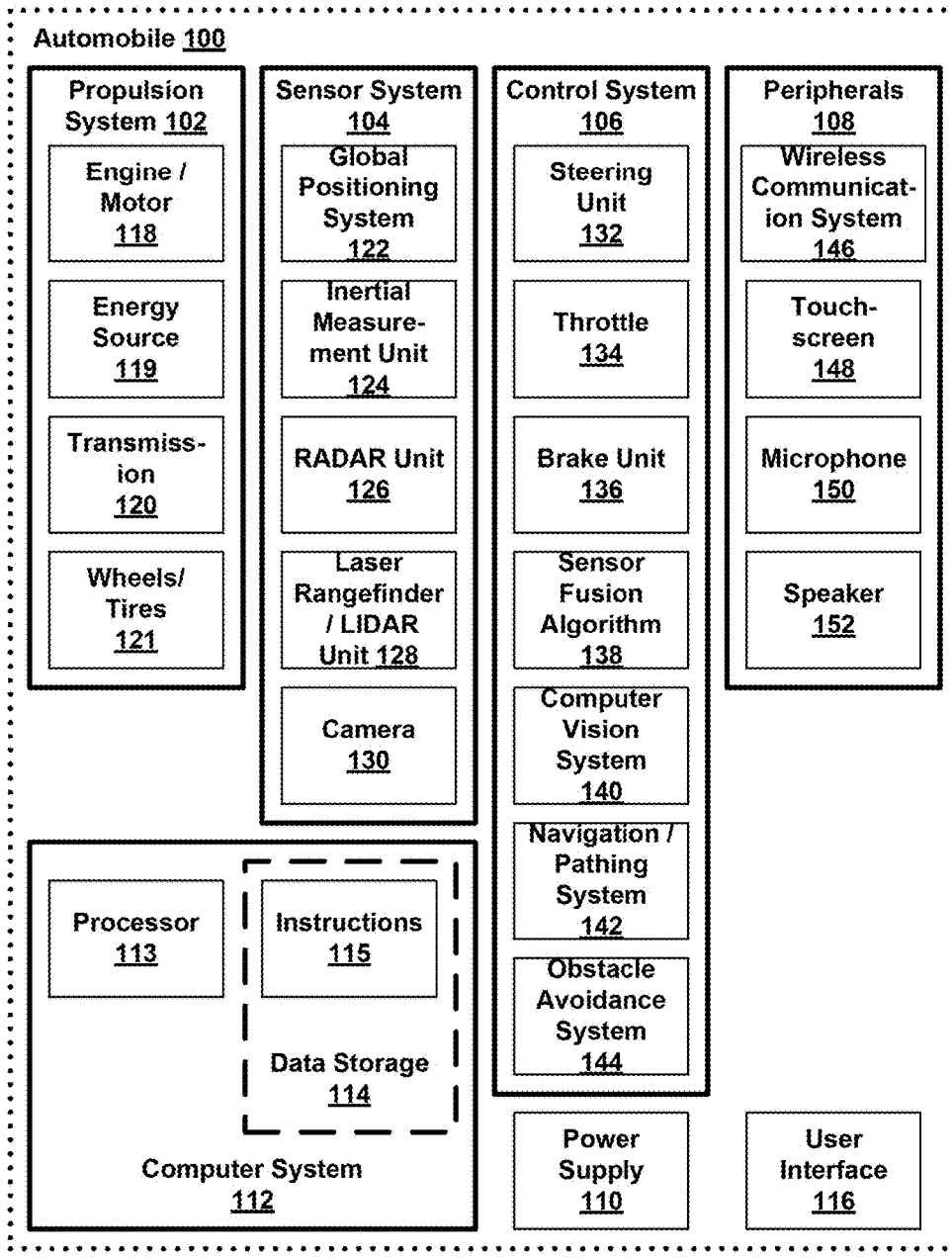
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Disclosed herein are methods and system that relate to modifying the behaviour of an autonomous vehicle using context based parameter switching. More particularly, disclosed embodiments relate to a vehicle operating in an autonomous mode that adjusts one or more parameters (e.g., in real time) based on the context or environment of the vehicle. The one or more parameters could include any parameter that affects how a sensor or other component of the vehicle functions in the autonomous mode. For example, a parameter may affect how one or more sensors of the vehicle obtain sensor data when the vehicle is in the autonomous mode, or how such sensor data is processed or evaluated. The context or environment could include any aspect of the vehicle's physical surroundings, such as the type of road on which the vehicle is operating (e.g., whether the road is a freeway or a surface street), the amount of traffic on the road, the lighting conditions, or the weather conditions.

By adjusting one or more parameters based on the vehicle's environment, the vehicle can be operated in the autonomous mode in a manner that is appropriate for that environment. For example, when the vehicle is operating on a surface street, the vehicle may obtain sensor data and apply algorithms that can be used to detect pedestrians and traffic lights. However, when the vehicle is on a freeway, the vehicle may obtain sensor data and apply algorithms that can be used to track nearby vehicles and detect the presence of construction zones. In general, usage of the vehicle's input, output, and/or computational resources can be controlled by environment-based parameters, so that the vehicle's resources are used more efficiently and in a manner that optimizes the vehicle's performance in that environment.

In some embodiments, the one or more parameters that are selected based on a vehicle's environment could include a sensor parameter that relates to a sensor of the vehicle. The sensor could be, for example, an image capture device (e.g., a camera), a Light Detection and Ranging (LIDAR) device, a radar device, or other type of sensor. In some examples, a sensor parameter may determine where a vehicle's sensor obtains sensor data. For example, a sensor parameter could be a distance parameter that defines a range of distances from the vehicle in which a sensor obtains sensor data. The range of distances could be defined by a radius of a circle centered at the vehicle, for example, if the sensor obtains data in a 360-degree angular range. Alternatively, the range of distances could correspond to a range of distances in a particular direction from the vehicle, such as ahead of the vehicle, behind the vehicle, or to one or both sides of the vehicle. For example, one or more distance parameters could control the operation of a sensor such that the sensor obtains sensor data in a first range of distances from the side of the vehicle and in a second, different range of distances ahead of and behind the vehicle. Having a sensor obtain sensor data at different distances in different directions can be appropriate when the vehicle is on a freeway. Specifically, in a freeway environment, it may be efficient for the vehicle to obtain sensor data from only one or two lanes to the side of the vehicle but obtain sensor data over longer distances ahead of and behind the vehicle. Other types of distance parameters are also possible.

In addition to distance parameters, sensor parameters could include a direction parameter that defines a range of directions from the vehicle in which a sensor obtains sensor data. For example, one value of a direction parameter may select a 360-degree angular range for detecting sensor data, whereas another value of the direction parameter may select a narrower angular range in a particular direction (e.g., a range of angles in front of the vehicle). Sensor parameters could also include a height parameter that defines a range of heights above the ground in which a sensor obtains sensor data. The range of heights could be direction dependent. For example, it may be beneficial for a sensor to obtain sensor data at greater range of heights in front of the vehicle than behind the vehicle, in order to detect upcoming signs or traffic lights.

Value(s) for a distance parameter, direction parameter, and/or height parameter could be selected for a sensor based on the vehicle's environment so that the sensor obtains sensor data in a region of interest that is relevant for that environment. For example, when an autonomous vehicle is driving on a freeway, the region of interest could correspond to a range of distances corresponding to about two lanes to either side of the vehicle and a greater distance ahead of and behind the vehicle. This region of interest could be sufficient to track nearby vehicles, detect construction zones, and perform other functions that are appropriate in a freeway environment. Moreover, with this region of interest, an autonomous vehicle may not need to use certain sensors, or reduce the amount of use of certain sensors.

On the other hand, when the vehicle is on a surface street, the region of interest could be defined by a sensor's maximum distance range and/or maximum angular range. This region of interest could be appropriate for a surface street environment in which other vehicles could be moving toward the vehicle from any direction, due to oncoming traffic, intersections, driveways, etc. The region of interest could also include a range of heights that is appropriate to detect traffic lights. Further, in order to detect pedestrians in a robust and reliable manner, the vehicle may use one or more sensors to constantly monitor areas where pedestrians might be present. Thus, to detect pedestrians when operating on a surface street, a vehicle may use a greater number of sensors and/or different types of sensors than when operating on a freeway. In general, the autonomous vehicle may determine a sensor region of interest based on the context or environment of the vehicle, and operate sensors of the vehicle to obtain sensor data within the sensor region of interest.

Instead of or in addition to defining a region of interest, a sensor parameter could define other aspects of a sensor's operation. For example, in the case of a LIDAR sensor, a sensor parameter may control the pulse rate and, hence, the angular resolution of the LIDAR data. In the case of an image capture device, a sensor parameter may control an exposure time or frame rate. Sensor parameters could also turn on or turn off one or more sensors based on the environment. Other types of sensor parameters are also possible.

In some embodiments, the one or more parameters that are selected based on a vehicle's environment could include a parameter that relates to how sensor data is processed or evaluated, such as processing the sensor data using different algorithms in different environments. For example, when a vehicle is operating on a surface street, a control system of the vehicle may use a traffic light detection algorithm that processes sensor data from one or more sensors in order to detect traffic lights and determine the states of detected traffic lights. In addition, the control system may use a pedestrian detection algorithm that processes sensor data from one or more sensors in order to detect pedestrians. When the vehicle is operating on a freeway, however, the traffic light detection algorithm and pedestrian detection algorithm could be turned off in order to conserve computational resources. The control system could also turn on other types of algorithms when operating on a freeway. Such freeway-appropriate algorithms could include a vehicle tracking algorithm that tracks other, nearby vehicles (e.g., so that the vehicle can maintain a safe distance from other vehicles), a lane estimation algorithm that identifies lane markers and/or a construction zone detection algorithm that can detect the presence of a construction zone (e.g., by detecting construction cones, construction barrels, or construction signs). Other types of algorithms may also be used in surface street, freeway, or other environments.

By selecting one or more parameters that control the operation of a vehicle's sensor(s), such as which sensors are used, where a sensor obtains sensor data, or how a sensor obtains sensor data, and/or one or more parameters that control what algorithms are used to process sensor data, based on the context or environment of the vehicle, the vehicle may obtain and utilize sensor data in a manner that optimizes the performance of the vehicle and makes efficient use of the vehicle's processing and computational resources.

Within the context of the disclosure, the vehicle may be operable in various modes of operation. Depending on the embodiment, such modes of operation may include manual, semi-autonomous, and autonomous modes. In particular, the autonomous mode may provide steering operation with little or no user interaction. Manual and semi-autonomous modes of operation could include greater degrees of user interaction.

Some methods described herein could be carried out in part or in full by a vehicle configured to operate in an autonomous mode with or without user interaction. In one example, a vehicle may determine an environment of the vehicle by operating a sensor that is configured to obtain sensor data of a sensed portion of the environment. The sensed portion of the environment may be defined by at least one sensor parameter. For example, the sensor may be a LIDAR device and the sensor parameter may be a distance parameter. In such an instance, the data may be obtained from the LIDAR device at distances up to a maximum distance defined by the distance parameter. In another example, the at least one sensor may be a radar device and the sensor parameter may be a direction parameter. In that instance, the radar device may be controlled to obtain data in the directions defined by the direction parameter. Other sensors and sensor parameters are also possible.

A vehicle may use various sources of information to determine the type of environment in which it is operating. In some examples, a vehicle may obtain its location (e.g., using GPS) and refer to a map to determine whether its location corresponds to a freeway environment, a surface street environment, or other type of environment. In other examples, a vehicle may determine that it is traveling on a freeway or surface street based on such characteristics as the shape of the road, the number of lanes, whether a median is present, whether intersections or cross-walks are present, whether traffic lights are present, whether pedestrians are present, and/or based on what type of signs are present. The vehicle could also determine the environment based on vehicle speeds and/or posted speed limits. For example, vehicle speeds or posted speed limits of 50 mph or greater could indicate a freeway environment, whereas vehicle speeds or posted speed limits of 30 mph or less could indicate a surface street environment. The environment of a vehicle could also be determined based on other characteristics of the vehicle's surroundings. In some examples, a vehicle may receive information about its environment from a server or other information source. A vehicle may also use any combination of these approaches to determine its environment, such as comparing sensor data obtained by one or more sensors to map data.

In addition to freeway and surface street environments, other types of environments could be defined. For example, a vehicle may distinguish between surface streets in urban settings and surface roads in rural settings. Freeway and/or surface street environments could be further defined based on the amount of traffic present. For example, a vehicle may define four different environments for purposes of parameter selection: high-traffic-freeway, low-traffic-freeway, high-traffic-surface-street, and low-traffic-surface-street. In some examples, environments could be defined based on lighting conditions. For instance, when light levels are low (e.g., at night) a sensor could be operated differently, or different algorithms could be used to process sensor data, than when light levels are high (e.g., during the day). In some examples, environments could be defined based on weather conditions. For instance, during inclement weather, such as fog, rain, or snow, sensors may be operated differently, or different sensors could be used, than when the weather is clear. Other types of environments could also be defined.

Based on the environment, the vehicle may select at least one parameter value for the at least one sensor parameter such that the sensed portion of the environment corresponds to a region of interest. The region of interest may be an area of the environment that the vehicle focuses on based on the characteristics of the environment. In other words, the region of interest may be a region that is particularly relevant given the context or environment of the vehicle. In some examples, the region of interest may be a certain portion of the environment and may be based on the type of road on which the vehicle is operating (e.g., a freeway or surface street). In other examples, the region of interest may be defined based on the activity of objects or things present in the environment. In further examples, the region of interest may be defined based on what the vehicle is doing. Other methods to define the region of interest are possible and contemplated herein. The parameter value may comprise a value that results in a sensor obtaining sensor data within the region of interest. For example, the parameter may be a distance parameter and the value may comprise a distance or range of distances that corresponds to the region of interest. In other examples, the parameter may be a direction parameter and the parameter value may comprise a certain direction that corresponds to the region of interest.

In one particular example, the vehicle may use a LIDAR device to sense that the vehicle has entered a freeway with at least one other vehicle. Based on the sensed environment, the vehicle may determine that the region of interest is a region including the other vehicle in relation to itself. Accordingly, the vehicle may use a distance parameter for the LIDAR device and select a parameter value of "2 lanes," or a distance value that corresponds to the width of two typical lanes of a freeway (e.g., 24 feet). This distance may correspond to the detection range along the sides of the vehicle; a greater detection range could be used ahead of and behind the vehicle. Using the parameter value, the vehicle may operate the LIDAR device to obtain sensor data within the region of interest. For example, using the "2 lanes" parameter value the vehicle may detect vehicles that are within two lanes of the vehicle, but not vehicles that are three or more lanes away from the vehicle.

As the vehicle continues to operate, the vehicle may operate the sensor using the selected parameter value to obtain sensor data of the region of interest. Similar to determining the environment of the vehicle, the sensor data of the region of interest may include more defined environment characteristic information regarding the current type of road the vehicle is traveling on (e.g., a freeway), external driving conditions (e.g., ice on the roadway), other vehicle presence (e.g., of traffic present), other vehicle speeds, obstacle presence (e.g., accidents or pedestrians and their respective locations), among other things. The sensor data of the region of interest may include more detailed information regarding the environment. In one instance, the vehicle may determine that it is no longer on a surface road, but instead traveling 50 miles-per-hour on a freeway with other vehicles in a traffic lane adjacent to the one it is travelling in. The vehicle may be controlled in an autonomous mode based on the sensor data of the region of interest. For example, the vehicle may be controlled to remain in the same lane based on the fact the other vehicles are adjacent to the vehicle.

Some methods disclosed herein may be carried out in part or in full by a server. In an example embodiment, the server may determine an environment of the vehicle. For example, the server may receive sensor data from the vehicle operating in the environment, such as a plurality of images captured using a camera. In other examples, the server may receive information regarding the environment of the vehicle from other sources. Based on the environment of the vehicle, the server may select a parameter value for a parameter that controls a particular sensor of the vehicle. The vehicle may use the parameter value to control the sensor to obtain data corresponding to a certain region of interest. Furthermore, based on the data obtained from the region of interest the server may remotely control the vehicle in the autonomous mode, for example, by providing instructions to the vehicle. Other instructions between a vehicle operating in an autonomous mode and a server are possible within the context of the present disclosure.

Vehicles are also described in the present disclosure. In one embodiment, the vehicle may include elements including a sensor and a computer system. The vehicle may be configured to operate in an autonomous mode. The sensor may be operated to obtain sensor data of a sensed portion of an environment of the vehicle. The sensed portion may be defined by at least one sensor parameter. The computer system may be configured to perform various functions based in full or in part on the acquired information. The functions may include determining, using a computer system, an environment of a vehicle. For example, the at least one sensor may be configured to detect a type of road the vehicle is traveling on. The functions may also include based on the environment of the vehicle, selecting at least one parameter value for the at least one sensor parameter such that the sensed portion of the environment corresponds to a region of interest. The functions may additionally include operating the sensor, using the selected at least one parameter value for the at least one sensor parameter, to obtain sensor data of the region of interest. The functions may further include controlling the vehicle in the autonomous mode based on the sensor data of the region of interest.

Also disclosed herein are non-transitory computer readable media with stored instructions. The stored instructions may be executable by a computing device to cause the computing device to perform functions similar to those described in the aforementioned methods.

There are many different specific methods and systems that could be used to effectuate the methods and systems described herein. Each of these specific methods and systems are contemplated herein, and several example embodiments are described below.

Example systems within the scope of the present disclosure will now be described in greater detail. Generally, an example system may be implemented in or may take the form of an automobile (i.e., a specific type of vehicle). However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the figures, FIG. 1 is a functional block diagram illustrating an automobile 100, according to an example embodiment. The automobile 100 could be configured to operate fully or partially in an autonomous mode. For example, in one embodiment, the automobile may be operable to determine an environment of the automobile. The automobile may comprise a sensor configured to obtain sensor data. Based on the environment, the automobile 100 may select a parameter value for a sensor parameter that controls the sensor such that the sensed portion of the environment corresponds to a region of interest. The region of interest may be any region that the automobile is focused on based on the environment of the vehicle. The automobile 100 may operate the sensor using the parameter value to control the sensor to obtain sensor data of the region of interest. Based on the sensor data obtained in the region of interest, the vehicle may be controlled in an autonomous mode. While in autonomous mode, the automobile 100 may be configured to operate without human interaction.

The automobile 100 could include various subsystems such as a propulsion system 102, a sensor system 104, a control system 106, one or more peripherals 108, as well as a power supply 110, a computer system 112, and a user interface 116. The automobile 100 may include more or fewer subsystems and each subsystem could include multiple elements. Further, each of the subsystems and elements of automobile 100 could be interconnected. Thus, one or more of the described functions of the automobile 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the automobile 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the automobile 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements. The drive shafts could include one or more axles that could be coupled to the one or more wheels/tires 121.

The wheels/tires 121 of automobile 100 could be configured in various formats, including a unicycle, bicycle/motorcycle, tricycle, or car/truck four-wheel format. Other wheel/tire geometries are possible, such as those including six or more wheels. Any combination of the wheels/tires 121 of automobile 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials.

The sensor system 104 may include a number of sensors configured to sense information about an environment of the automobile 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the automobile 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the automobile 100. To this end, GPS 122 could include a transceiver operable to provide information regarding the position of the automobile 100 with respect to the Earth.

The IMU 124 could include any combination of sensors (e.g., accelerometers and gyroscopes) configured to sense position and orientation changes of the automobile 100 based on inertial acceleration.

The RADAR unit 126 may represent a system that utilizes radio signals to sense objects within the local environment of the automobile 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the automobile 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the automobile 100. The camera 130 could be a still camera or a video camera.

The control system 106 may be configured to control operation of the automobile 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of automobile 100.

The throttle 134 could be configured to control, for instance, the operating speed of the engine/motor 118 and, in turn, control the speed of the automobile 100.

The brake unit 136 could include any combination of mechanisms configured to decelerate the automobile 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of automobile 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of automobile 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the automobile 100. The navigation and pathing system 142 may additionally be configured to update the driving path dynamically while the automobile 100 is in operation. In some embodiments, the navigation and pathing system 142 could be configured to incorporate data from the sensor fusion algorithm 138, the GPS 122, and one or more predetermined maps so as to determine the driving path for automobile 100.

The obstacle avoidance system 144 could represent a control system configured to identify, evaluate, and avoid or otherwise negotiate potential obstacles in the environment of the automobile 100.

The control system 106 may additionally or alternatively include components other than those shown and described.

Peripherals 108 may be configured to allow interaction between the automobile 100 and external sensors, other automobiles, and/or a user. For example, peripherals 108 could include a wireless communication system 146, a touchscreen 148, a microphone 150, and/or a speaker 152.

In an example embodiment, the peripherals 108 could provide, for instance, means for a user of the automobile 100 to interact with the user interface 116. To this end, the touchscreen 148 could provide information to a user of automobile 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the automobile 100 to communicate with devices within its environment. The microphone 150 may be configured to receive audio (e.g., a voice command or other audio input) from a user of the automobile 100. Similarly, the speakers 152 may be configured to output audio to the user of the automobile 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of automobile 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of automobile 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the automobile 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by automobile 100 and computer system 112 at during the operation of the automobile 100 in the autonomous, semi-autonomous, and/or manual modes.

The automobile 100 may include a user interface 116 for providing information to or receiving input from a user of automobile 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the automobile 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the automobile 100 and its subsystems.

The various subsystems (e.g., propulsion system 102, sensor system 104, and control system 106) elements (e.g., RADAR Unit 126, Brake Unit 136, and Speaker 152) in automobile 100 may be controlled by parameters. The subsystem inputs received by the computer system 112 may be generated, for example, based on parameters that allow the various subsystems and their elements to operate. For example, sensor system 104 may utilize parameters including a device type, a detection range, a camera type, and a time value to operate its elements, and control system 106 may utilize parameters including a lane change rate, a current-lane-position change indicator, a speed, and a horn rate to operate its elements. Other parameters may be used. The parameter values of the various parameters may be a numeric value, a boolean value, a word, or a range, for example. The parameter values may be fixed or adjusted automatically. Automatic parameter value adjustments may be determined, for example, based on a current context (information about the automobile 100 and an environment of the automobile 100) of the automobile 100. Parameter values could also be determined based on user input via the user interface 116. In another example, parameter values may be learned, for example, based on the preference of a user while the automobile 100 is operating in an environment. In a specific embodiment, for example, sensor system 104 may utilize a range parameter for the Laser Rangefinder/LIDAR Unit 128 with a parameter value of "10 feet." Accordingly, the sensor system 104 may generate an input causing the computer system 112 to control the Laser Rangefinder/LIDAR Unit 128 to only detect objects within 10 feet of the automobile 100.

The components of automobile 100 could be configured to work in an interconnected fashion with other components within or outside their respective systems. In an example embodiment, the computer system 112 could operate at least one sensor of the automobile 100 to determine an environment of the vehicle. For example, the automobile may determine that the automobile is on a surface road. In other examples, the computer system 112 may receive information about the environment, from a server or database for example. In one example, the computer system may receive a terrain map of the environment, and use the terrain map to determine information about the environment. Based on this determination, the computer system 112 may determine a parameter value for a sensor parameter to control a sensor of the automobile to obtain sensor data that corresponds to a certain region of interest. In one example, the computer system may determine a parameter value of "indefinite" for a distance parameter for the Laser Rangefinder/LIDAR Unit 128 thereby controlling the automobile to detect objects using a maximum range of the Laser Rangefinder/LIDAR Unit 128 of the automobile 100. In another example, the computer system of the automobile may determine a parameter value of "20 degrees" for an operating altitude parameter for the Camera 130 thereby controlling the Camera 130 to capture a plurality of images from a certain operating altitude. Other sensor parameters and parameter values may be used by the automobile and are described in greater detail later in this disclosure.

Once the computer system 112 has determined or selected a parameter value for the applicable sensor of the automobile, the automobile may operate the sensor using the parameter value to obtain data of a region of interest. Referring to the aforementioned Laser Rangefinder/LIDAR Unit example, for example, the computer system 112 may control the automobile 100 to obtain data using a maximum or indefinite range of the Laser Rangefinder while the automobile is operating on the surface road. In this example, the maximum range of the Laser/Rangefinder may correspond to the region of interest. Once the sensor data corresponding to the region of interest has been obtained, the computer system 112 may control the vehicle in an autonomous mode based on the sensor data of the region of interest obtained by the Laser/Rangefinder.

Although FIG. 1 shows various components of automobile 100, i.e., wireless communication system 146, computer system 112, data storage 114, and user interface 116, as being integrated into the automobile 100, one or more of these components could be mounted or associated separately from the automobile 100. For example, data storage 114 could, in part or in full, exist separate from the automobile 100. Thus, the automobile 100 could be provided in the form of device elements that may be located separately or together. The device elements that make up automobile 100 could be communicatively coupled together in a wired and/or wireless fashion.

Figure 2:
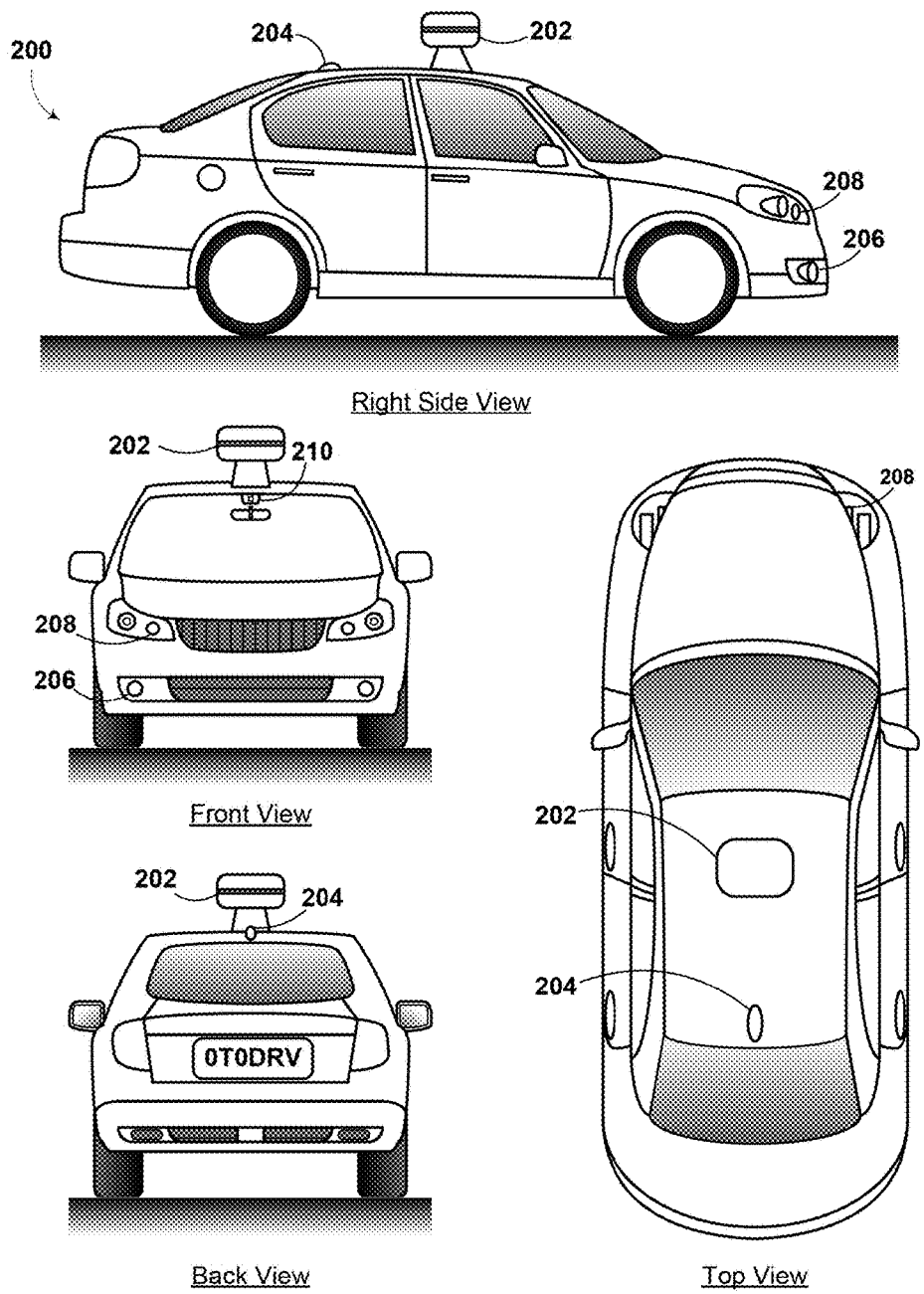
FIG. 2 is a vehicle, in accordance with an example embodiment.

FIG. 2 shows an automobile 200 that could be similar or identical to automobile 100 described in reference to FIG. 1. Although automobile 200 is illustrated in FIG. 2 as a car, other embodiments are possible. For instance, the automobile 200 could represent a truck, a van, a semi-trailer truck, a motorcycle, a golf cart, an off-road vehicle, or a farm vehicle, among other examples.

Depending on the embodiment, automobile 200 could include a sensor unit 202, a wireless communication system 204, a LIDAR unit 206, a laser rangefinder unit 208, and a camera 210. The elements of automobile 200 could include some or all of the elements described for FIG. 1.

The sensor unit 202 could include one or more different sensors configured to capture information about an environment of the automobile 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the automobile 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the automobile 200 as depicted in FIG. 2. Alternatively, the wireless communication system 204 could be located, fully or in part, elsewhere. The wireless communication system 204 may include wireless transmitters and receivers that could be configured to communicate with devices external or internal to the automobile 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the automobile 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the automobile 200 illuminates an object in the environment with a predetermined light pattern, such as a grid or checkerboard pattern and uses the camera 210 to detect a reflection of the predetermined light pattern off the object. Based on distortions in the reflected light pattern, the automobile 200 may determine the distance to the points on the object. The predetermined light pattern may comprise infrared light, or light of another wavelength. As another example, the camera 210 may use a laser scanning technique in which the automobile 200 emits a laser and scans across a number of points on an object in the environment. While scanning the object, the automobile 200 uses the camera 210 to detect a reflection of the laser off the object for each point. Based on a length of time it takes the laser to reflect off the object at each point, the automobile 200 may determine the distance to the points on the object. As yet another example, the camera 210 may use a time-of-flight technique in which the automobile 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the automobile 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the automobile 200. Specifically, as illustrated, the camera 210 could capture images from a forward-looking view with respect to the automobile 200. Other mounting locations and viewing angles of camera 210 are possible, either inside or outside the automobile 200.

The camera 210 could have associated optics that could be operable to provide an adjustable field of view. Further, the camera 210 could be mounted to automobile 200 with a movable mount that could be operable to vary a pointing angle of the camera 210.

Figure 3A:
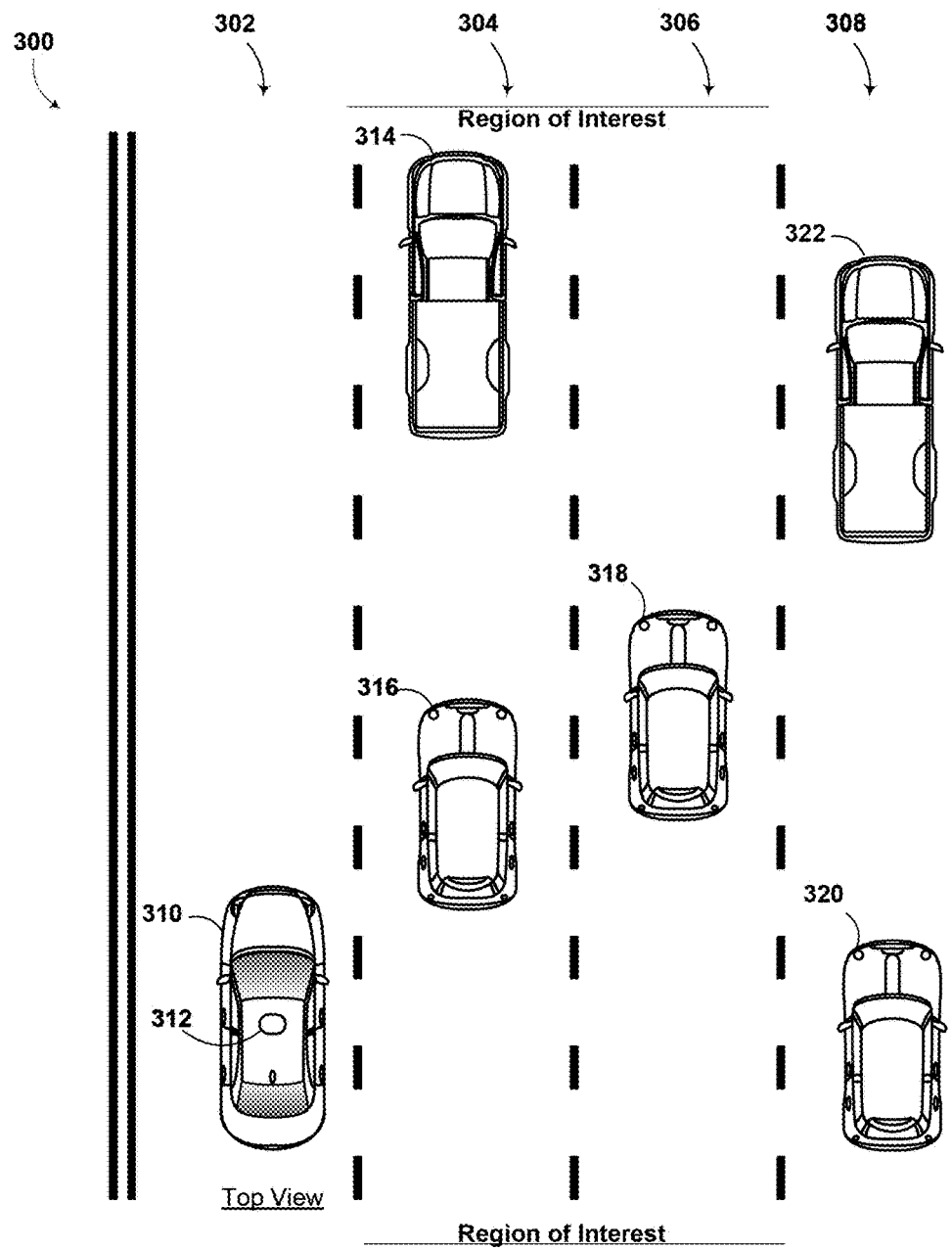
FIG. 3A is a top view of an autonomous vehicle operating scenario, in accordance with an example embodiment.

FIG. 3A illustrates a scenario 300 involving a freeway with a left-most lane 302, a first-center lane 304, a second-center lane 306, and a right-most lane 308. An automobile 310 operating in an autonomous mode may operate a sensor of the sensor unit 312 to determine an environment of the automobile. Environment characteristics may include characteristics of varying detail that describe the environment of the vehicle. For example, environment characteristics of scenario 300 may include information regarding a road type, a location of obstacles, traffic density, and weather, among other characteristics. In one instance, the automobile may determine that its environment includes the freeway 300, truck 314, and cars 316 and 318, and the automobile 310 may sense the presence of truck 314 and cars 316 and 318. Based on some or all of this environment characteristic information, the automobile 310 may select a parameter value of a sensor parameter of a sensor of the sensor unit 312 such that the sensor senses data that corresponds to a certain region of interest that is relevant to the vehicle's environment.

For example, in the scenario of FIG. 3A, the region of interest may be selected so that automobile 310 can detect and track other vehicles that are within a certain proximity to automobile 310. Since automobile 310 is traveling in left-most lane 302, the region of interest need not extend an appreciable distance to the left of automobile 302. However, it may useful for automobile 310 to track vehicles operating in lanes 304 and 306, as such vehicles could potentially move into lane 302 or automobile 310 may decide to navigate to lane 304 or 306. Accordingly, the automobile 310 may use a LIDAR device controlled by a distance parameter with a parameter value of "2 lanes." Although the parameter value is given herein as "2 lanes", it is to be understood that the parameter value could be given as "2", as "two lanes", as a distance corresponding to two lanes, such as "24 feet", or as any combination of one or more characters recognizable by automobile 310 as an instruction to control the LIDAR device to detect objects within two lanes.

Based on the parameter value of "2 lanes," the LIDAR device in automobile 310 senses lanes 304 and 306, but not lane 308. Thus, lanes 304 and 306 are labeled as the "region of interest" in FIG. 3A. It is to be understood, however, that FIG. 3A is not intended to show how far the "region of interest" extends ahead of and behind the vehicle. For example, the "2 lane" parameter value may define only the LIDAR's detection range to one side of automobile 310. The LIDAR's detection range ahead of and behind automobile 310 could be defined by a different parameter value and could correspond to a distance that is greater than two lanes. It is also to be understood that the "2 lane" parameter value is only one possible example of a sensor parameter that might be selected in the environment illustrated in FIG. 3A. In other examples, a parameter value of "1 lane" might be selected, in which case the LIDAR device in automobile would sense lane 304 but not lanes 306 and 308. In still other examples, the sensor parameter that is selected could define an angular range of the LIDAR sensor, such as a range of angles to the right of automobile 310.

Automobile 310 may be controlled in an autonomous mode based on the sensor data obtained from the "region of interest," i.e., lanes 304 and 306. For example, in this scenario the sensor data from the LIDAR device, sensing lanes 304 and 306, could be used to determine that cars 316 and 318, and truck 314 are all traveling straight. As a result, the automobile 310 may be controlled to travel in the left-most lane 302 at a speed of 50 miles-per-hour, for example. In contrast, vehicles 320 and 322 in lane 308 are sufficiently far away so as to be unlikely to affect the behavior of automobile 310. Thus, by confining the region of interest to lanes 304 and 306, automobile 310 may obtain relevant sensor data more quickly and/or with less processing than if lane 308 were also sensed.

Figure 3B:
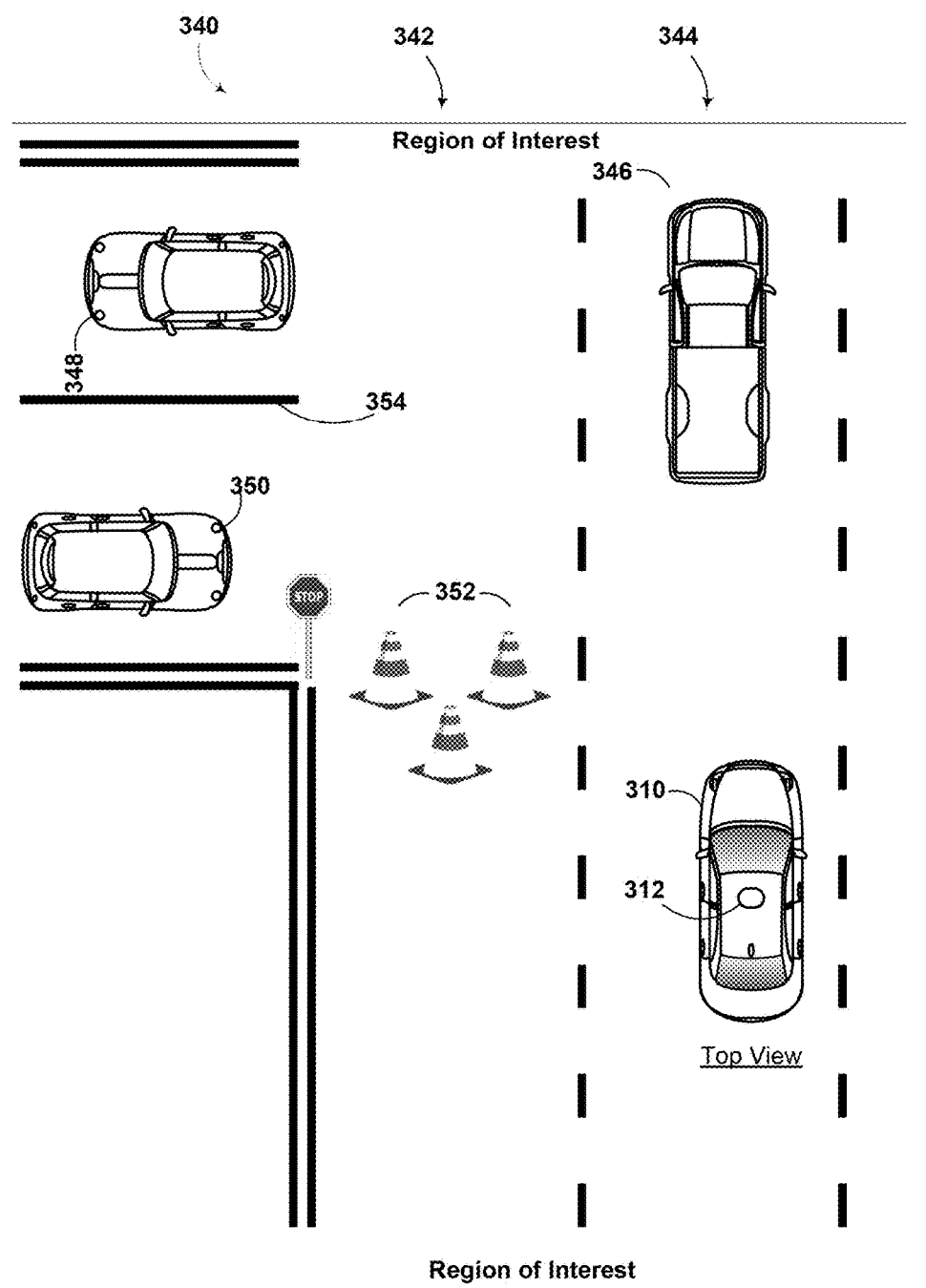
FIG. 3B is a top view of an autonomous vehicle operating scenario, in accordance with an example embodiment.

FIG. 3B illustrates a scenario 340 similar to that in FIG. 3A, but in a different environment. In FIG. 3B, the number of lanes has decreased to two: a left-most lane 342 and a right-most lane 344, and the automobile 310 is no longer on a freeway, but rather traveling on a surface road. The number of other vehicles has decreased to three: truck 346 and cars 348 and 350. In this scenario, based on the aforementioned environment characteristics, the automobile may determine that the entire surface road is of interest to it. In this example, as shown in FIG. 3B, the "region of interest" is the entire surface road including lanes 342 and 344 and intersection 354. Accordingly, the computer system of the automobile 310 may select a parameter value of "indefinite" for the distance parameter and a parameter value of "360 degrees" for a direction parameter. Accordingly, the LIDAR device may detect objects with its maximum range and in any direction to the automobile 310. For example, the automobile may detect obstacles 352, intersection 354, as well as cars 348 and 350 that are traveling in different directions and on different roads than automobile 310. Based on the sensor data of the region of interest, the automobile may be controlled to avoid obstacles 352 and cautiously proceed past intersection 354, for example.

In another example, the parameter value may be determined based on the activity of the vehicle. For example, when the automobile 310 makes a left turn, the automobile may select a parameter value such that the region of interest may be changed to focus on intersection 354 and cars 348 and 350. In yet another example, the automobile may determine the parameter value based on objects within the environment. For example, once the automobile 310 detects obstacles 352, the computer system of the automobile 310 may select a parameter value for a sensor parameter such that the region of interest is on the obstacles 352 until the automobile safely passes the automobile, for example.

Figure 4:
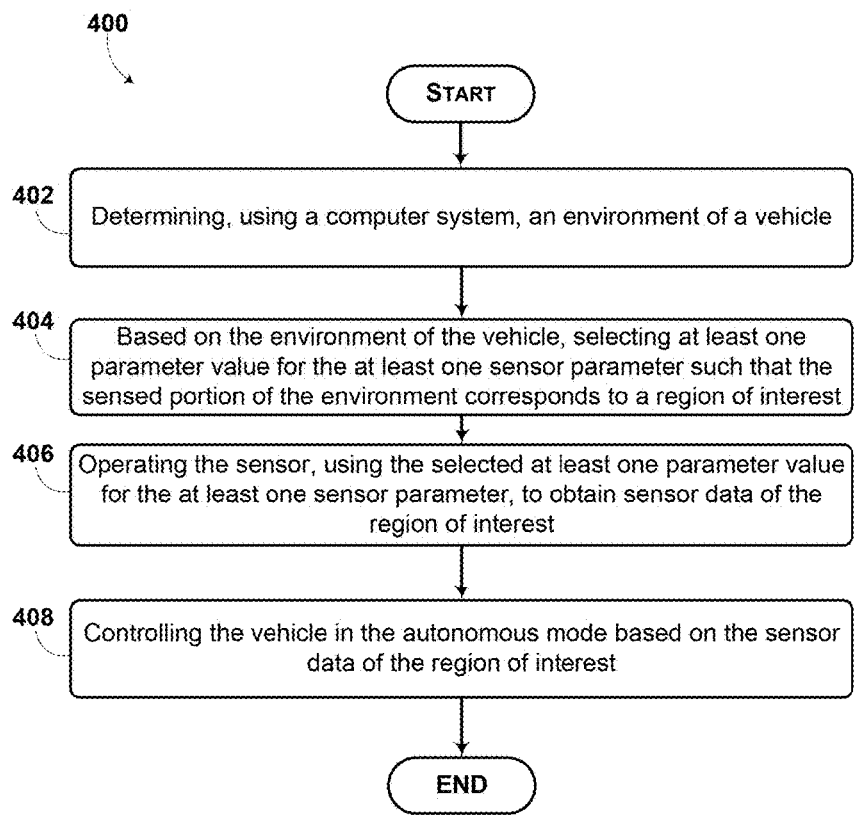
FIG. 4 is a block diagram of a method for modifying the behavior of an autonomous vehicle using context based parameter switching, in accordance with an example embodiment.

A method 400 is provided for modifying the behavior of an autonomous vehicle using context based parameter switching. The method could be performed using the apparatus shown in FIGS. 1 and 2 and described above; however, other configurations could be used. FIG. 4 illustrates the steps in an example method, however, it is understood that in other embodiments, the steps may appear in a different order, and steps could be added or subtracted.

Step 402 includes determining, using a computer system, an environment of a vehicle. The vehicle may be configured to operate in an autonomous mode and may comprise a sensor configured to obtain sensor data of a sensed portion of the environment. The sensed portion of the environment may be defined by at least one sensor parameter. The vehicle described in this method may be the automobile 100 and/or automobile 200 as illustrated and described in reference to the FIGS. 1 and 2, respectively, and will be referenced as such in discussing method 400. Operating a sensor of the automobile may include, for example, operating any of the sensors included in the sensor system 104. The operating sensor may be controlled using a sensor parameter to obtain sensor data in an environment of the automobile 100. In some instances, multiple sensors may be used. The sensor parameter may be any parameter that controls where or how the sensor obtains sensor data. For example, a distance parameter, direction parameter, or height parameter may be used to control where the sensor obtains data. Other parameters may control how a sensor obtains sensor data. For example, a shutter speed parameter, frame rate parameter, or exposure time parameter could be used.

Determining the environment of the automobile 100 may include determining any relevant characteristics of the current context and environment of the automobile. For example, the automobile could obtain sensor data relating to the speed, position, heading, and current lane of the automobile, as well as obtain sensor data relating to the current lane of other automobiles, obstacles, roadway boundaries, roadway conditions, and weather indications and conditions. In one example, the automobile 100 may determine that it is operating in an environment traveling above 55 miles-per-hour. Based on the fact the automobile is traveling above 55 miles-per-hour, the automobile 100 may determine it is operating on a freeway, for example. In another example, the automobile 100 may determine that it is operating in an environment comprising a surface street based on the presence of traffic signals and the fact the vehicle is traveling below 30 miles-per-hour.

In other examples, the vehicle may determine the environment by receiving a terrain map defining the environment of the vehicle, comparing a terrain map defining the environment of the vehicle to sensor data obtained by a sensor of the vehicle, determining the number of lanes in the environment, determining the presence of a median in the environment, determining a shape of a road in the environment, determining a speed limit in the environment, determining a presence of pedestrians in the environment, determining a presence of a traffic light in the environment, or determining a presence of a cross walk in the environment. Other environmental characteristics may be determined and are contemplated herein. Depending upon the embodiment, the determination may be made fully or in part by a control system in the vehicle or by a server network and communicated to the vehicle.

Step 404 includes based on the environment of the vehicle, selecting at least one parameter value for the at least one sensor parameter such that the sensed portion of the environment corresponds to a region of interest. The parameter value may include a numeric value, a boolean value, a word, or any other data that identifies a distance or range of distances. In other examples, the parameter value may identify an angular range and/or a particular direction, such "360 degrees" or "60 degrees in front." In even further examples, the parameter value may identify a height or range of heights above the vehicle or road surface. Depending upon the embodiment, the selection may be made fully or in part by a control system in the vehicle or fully or in part by a server network and communicated to the vehicle. The selection may further be made by a user, for example. The parameter value may be determined based on the activity of the vehicle or an activity of an object in the environment. Example activities of the vehicle may include making turns, reversing direction, or stopping, for example. An example activity of an object may be movement of the object, for example.

Once the parameter value has been selected, step 406 comprises operating the sensor, using the selected at least one parameter value for the at least one sensor parameter, to obtain sensor data of the region of interest. As previously described, the region of interest may be an area of the environment that the vehicle focuses on based on the characteristics of the environment. In other words, the region of interest may be a portion of the vehicle's surroundings that is appropriate to monitor, given the context or environment of the vehicle. By defining the region of interest in this way, the vehicle may more effectively and accurately obtain sensor data. The region of interest may be defined by the parameter value for the sensor parameter. Accordingly, the region of interest may include an angular region in front of, behind, or to the side of the vehicle. In other examples, the region of interest may include a lateral area to either side of the vehicle or a defined area above or below the vehicle. The vehicle may be operated using the selected parameter to obtain sensor data in the desired region of interest determined by the preceding step, step 404.

In some examples, a parameter value that is selected based on the environment may control whether a particular algorithm that can be used to process sensor data is turned on or turned off. For example, if automobile 100 is operating in a freeway environment, computer system 112 in automobile 100 may select one or more parameter values that turn off traffic signal detection and pedestrian detection, algorithms which automobile 100 may use in a surface street environment. The one or more parameter values may also turn on one or more algorithms that are relevant to the freeway environment, such as lane estimation and construction cone detection algorithms.

Step 408 comprises controlling the vehicle in the autonomous mode based on the sensor data of the region of interest. For example, computer system 112 may control automobile 100 to act in response to the sensor data acquired by one or more sensors in sensor system 104 in step 406. In some instances, the computer system may control the automobile to accelerate, decelerate, and/or change heading. In other instances, the computer system may cause the automobile to maintain a current speed and heading. In a scenario where the automobile is traveling on a freeway, such as the scenario depicted in FIG. 3A, automobile 310 may not need to slow down or change lanes based on data obtained from a region of interest. Because the automobile is not likely to encounter the other vehicles, for example, which may require it to change its driving condition, the computer system may control the automobile to continue at the same speed and to remain within the same driving lane.

Example methods, such as method 400 of FIG. 4 may be carried out in whole or in part by the automobile and its subsystems. Accordingly, example methods could be described by way of example herein as being implemented by the automobile. However, it should be understood that an example method may be implemented in whole or in part by other computing devices. For example, an example method may be implemented in whole or in part by a server system, which receives data from a device such as those associated with the automobile. Other examples of computing devices or combinations of computing devices that can implement an example method are possible.

Figure 5:
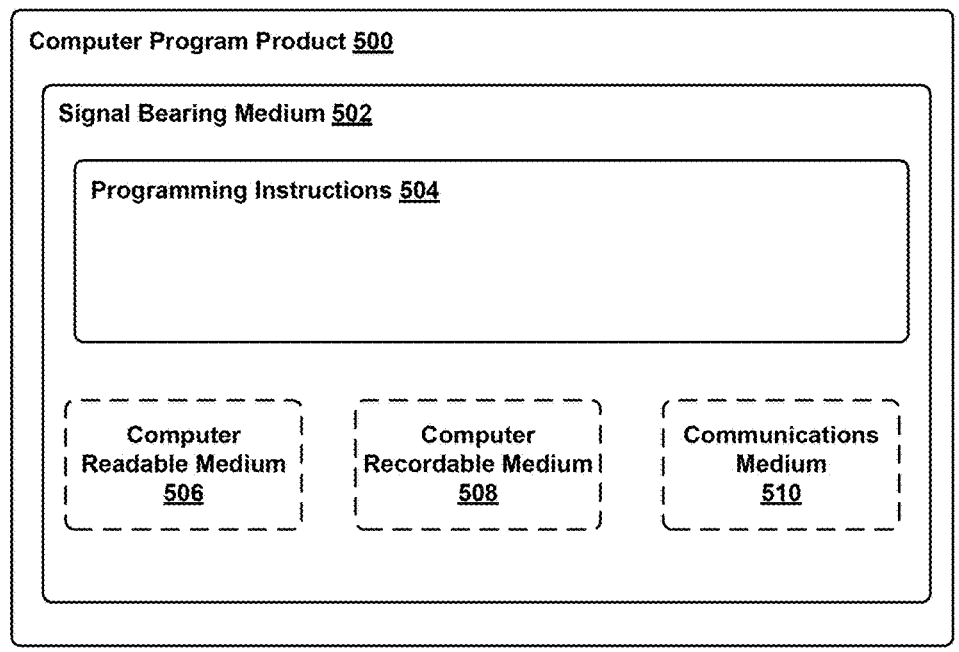
FIG. 5 is a functional block diagram illustrating a computer program product, in accordance with an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be an automobile, such as the automobile 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

The invention claimed is:

1. A method comprising: receiving, from a sensor unit of an autonomous vehicle, information indicative of an environment of the autonomous vehicle; determining, based on the received information, at least one environmental characteristic of the autonomous vehicle, wherein the at least one environmental characteristic comprises a location of at least one other vehicle, a direction of travel of the at least one other vehicle, and a speed of travel of the at least one other vehicle; based on the determined environmental characteristic, determining a region of interest; based on the determined region of interest, selecting a distance parameter value of the sensor unit; and operating the sensor unit based on the selected distance parameter value to obtain sensor data of the region of interest; and controlling the autonomous vehicle based on the sensor data of the region of interest.

2. The method of claim 1, wherein the at least one environmental characteristic further comprises a type of road and traffic condition, and wherein the type of road and traffic condition is one of: a high-traffic-freeway, a low-traffic-freeway, a high-traffic-surface-street, or a low-traffic-surface-street.

3. The method of claim 1, wherein the distance parameter comprises an integer number of lanes away from a current lane of travel of the vehicle.

4. The method of claim 1, wherein the sensor unit comprises a LIDAR sensor.

5. The method of claim 4, wherein the distance parameter comprises a scanning distance in at least one direction from the vehicle, and wherein the distance parameter is based on an angular scanning range of the LIDAR sensor.

6. The method of claim 1, wherein the sensor unit comprises at least one of: a camera sensor or a RADAR sensor.

7. The method of claim 1, wherein determining the region of interest is based on a distance between the vehicle and the at least one other vehicle on a roadway.

8. The method of claim 1, wherein the at least one environmental characteristic further comprises a current lane of the vehicle, and wherein determining the region of interest comprises confining the region of interest based on the current lane of the vehicle.

9. The method of claim 8, wherein the current lane of the vehicle is an edge lane of a roadway, and wherein confining the region of interest comprises confining the region of interest to the roadway.

10. A method comprising: receiving, from a sensor unit of an autonomous vehicle, information indicative of an activity of the autonomous vehicle, wherein the activity comprises the autonomous vehicle moving in a new direction of travel; based on the received information, determining a region of interest, wherein the region of interest comprises a roadway along the new direction of travel; based on the determined region of interest, selecting a distance parameter value or a direction parameter of the sensor unit; operating the sensor unit based on the selected distance parameter value and the selected direction parameter to obtain sensor data of the region of interest; and controlling the autonomous vehicle based on the sensor data of the region of interest.

11. The method of claim 10, wherein the vehicle is configured to operate in an autonomous mode.

12. The method of claim 10, wherein at least a portion of the roadway along the new direction of travel comprises an intersection.

13. The method of claim 10, wherein at least a portion of the roadway along the new direction of travel comprises a construction zone.

14. The method of claim 10, wherein at least a portion of the roadway along the new direction of travel comprises a driveway.

15. The method of claim 10, further comprising receiving information indicative of at least one other vehicle on the roadway along the new direction of travel, wherein determining the region of interest is further based on the information indicative of the at least one other vehicle.

16. The method of claim 10, further comprising receiving information indicative of at least one obstacle on the roadway along the new direction of travel, wherein determining the region of interest is further based on the information indicative of the at least one obstacle.

17. The method of claim 10, wherein operating the sensor unit based on the selected distance parameter value and the selected direction parameter comprises operating the sensor unit over a range of distances or a range of directions that are less than a maximum distance or a maximum range of direction, respectively.

18. A method comprising: operating a sensor unit of an autonomous vehicle within a first region of interest, wherein operating the sensor unit within the first region of interest comprises obtaining sensor data from a first set of sensors; receiving information indicative of an activity of at least one other object in an environment; based on the received information, determining a second region of interest, wherein the second region of interest includes the at least one other object in the environment; based on the determined second region of interest, obtaining sensor data from a second set of sensors; selecting a distance parameter value and a direction parameter of the sensor unit; operating the sensor unit based on the selected distance parameter value and the selected direction parameter; and controlling the autonomous vehicle based on sensor data of the second region of interest.

19. The method of claim 18, wherein the at least one other object in the environment comprises another vehicle, wherein the activity comprises at least one of the other vehicle: slowing down, speeding up, or changing lanes.

20. The method of claim 18, wherein the at least one other object in the environment comprises a pedestrian, wherein the activity comprises movement of the pedestrian towards a cross walk.

* * * * *